United States Patent
Goto et al.

(10) Patent No.: US 8,043,766 B2
(45) Date of Patent: Oct. 25, 2011

(54) FUEL CELL EXHIBITING ENHANCED SEPARATOR SEALING STRUCTURE

(75) Inventors: Shuhei Goto, Utsunomiya (JP); Natsuki Anzai, Nasukarasuyama (JP); Daisuke Okonogi, Shioya-gun (JP); Hiroyuki Tanaka, Utsunomiya (JP); Kazuo Nunokawa, Utsunomiya (JP); Masaaki Sakano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 776 days.

(21) Appl. No.: 12/104,771

(22) Filed: Apr. 17, 2008

(65) Prior Publication Data
US 2008/0261104 A1 Oct. 23, 2008

(30) Foreign Application Priority Data
Apr. 18, 2007 (JP) .................................. 2007-109140

(51) Int. Cl.
*H01M 2/08* (2006.01)
*H01M 8/10* (2006.01)
(52) U.S. Cl. .......................... 429/508; 429/483; 429/522
(58) Field of Classification Search .................. 429/437, 429/456, 469, 482, 508
See application file for complete search history.

(56) References Cited

U.S. PATENT DOCUMENTS

2003/0152819 A1* 8/2003 Hatoh et al. .................... 429/32
2004/0137308 A1* 7/2004 Maeda et al. ................... 429/38

FOREIGN PATENT DOCUMENTS

| JP | 06-267567 | 9/1994 |
| JP | 07-249417 | 9/1995 |
| JP | 2004-207074 | 7/2004 |

OTHER PUBLICATIONS

Machine Translation of: JP 07/249417 A, Nonobe et al., Sep. 26, 2005.*

* cited by examiner

*Primary Examiner* — Jonathan Crepeau
*Assistant Examiner* — Kenneth Douyette
(74) *Attorney, Agent, or Firm* — Nelson Mullins Riley & Scarborough LLP; Anthony A. Laurentano

(57) ABSTRACT

Auxiliary seals are provided on a surface of a first metal separator, between load receivers and an oxygen-containing gas supply passage, a fuel gas supply passage, an oxygen-containing gas discharge passage, and a fuel gas discharge passage, in relatively wide areas. The cross sectional shape of the auxiliary seal is the same as those of a flow field seal and ring-like seals, and the auxiliary seals are formed independently from the flow field seal and the ring-like seals.

7 Claims, 7 Drawing Sheets

FUEL CELL EXHIBITING ENHANCED SEPARATOR SEALING STRUCTURE

BACKGROUND OF THE INVENTION

1. Field of the Invention

The present invention relates to a fuel cell formed by stacking an electrolyte electrode assembly and a metal separator in a stacking direction. The electrolyte electrode assembly includes a pair of electrodes, and an electrolyte interposed between the electrodes. The metal separator includes a seal member. A passage for at least a reactant gas extends through a corner of the metal separator in the stacking direction.

2. Description of the Related Art

For example, a polymer electrolyte fuel cell employs a membrane electrode assembly (electrolyte electrode assembly) which includes an anode, a cathode, and an electrolyte membrane interposed between the anode and the cathode. The electrolyte membrane is a solid polymer ion exchange membrane. The membrane electrode assembly is sandwiched between separators. In use, several tens to hundreds of fuel cells are stacked together to form a fuel cell stack.

In the so called internal manifold structure, passages for reactant gases and a coolant extend through the fuel cells in the stacking direction. In the structure, reactant gas flow fields for supplying reactant gases along electrode surfaces, coolant flow fields for supplying a coolant along the separator surfaces in each of the cells, or in every certain number of cells, and the passages need to be sealed desirably.

In the metal separator of a type in which a seal member is formed integrally with a thin metal plate, in order to achieve size and weight reduction, the thickness of the metal plate is reduced. Thus, at the time of stacking the fuel cell, when displacement of the seal positions between adjacent two metal separators (hereinafter also referred to as the seal displacement) occurs, by the reaction force of the seal member itself (the moment caused by the linear pressure of the seal member), the metal plates tend to be deformed significantly. Thus, it may not be possible to maintain the sealing performance in an area where the stress tends to be concentrated, for example, at the corner of the passage.

In this regard, for example, a fuel cell as disclosed in Japanese Laid-Open Patent Publication No. 06-267567 is known. As shown in FIG. 7, packings 3 are provided on both sides of a cell 1 of the fuel cell through spacers 2. On one surface of the cell 1, a bipolar separator 4 is provided. A large number of the cells 1 and the bipolar separators 4 are stacked together to form a stack body 5. The stack body 5 is provided between flanges 7 through end separators 6. By tightening the flanges 7 together by bolts 8, a predetermined tightening force is applied to the stack body 5.

In the conventional technique, the packings 3 are provided on both sides of the cell 1 through the plates of the spacers 2. The packings 3 seal a plurality of passages 9 formed in the bipolar separators 4. In the structure, when the bipolar separator 4 is formed by a thin metal separator, if any seal displacement occurs due to variation in the size of the product or assembling accuracy, the bipolar separator 4 bends by the moment of the seal linear pressure, and the sealing performance is lowered.

SUMMARY OF THE INVENTION

A main object of the present invention is to provide a fuel cell having simple structure in which it is possible to reliably prevent a metal separator from bending, while achieving the desired sealing performance.

The present invention relates to a fuel cell formed by stacking an electrolyte electrode assembly and a metal separator in a stacking direction. The electrolyte electrode assembly includes a pair of electrodes, and an electrolyte interposed between the electrodes. The metal separator includes a seal member. A passage for at least a reactant gas extends through a corner of the metal separator in the stacking direction.

Resin load receivers are provided in an outer end of the metal separator. The corner is interposed between the resin load receivers. The seal member includes a surrounding seal formed around the passage, and an auxiliary seal provided between one of the resin load receivers and the passage. The auxiliary seal has the same shape in cross section as the surrounding seal.

The load receiver has a function to receive a load in the stacking direction when the metal separator and the electrolyte electrode assembly are stacked together. Further, at the time of placing the fuel cell in the casing, the load receiver functions to prevent displacement of the fuel cell in the lateral direction (perpendicular to the stacking direction).

According to the present invention, in the area near the passage, the auxiliary seals are provided, in particular, in the area between the passage and the resin load receiver where the metal separator tends to bend. Thus, even in the case of using a thin metal separator, it is possible to reliably prevent the thin metal separator from bending in opposition to the reaction force generated by seal displacement. Thus, with the simple structure, it is possible to maintain the desired sealing performance, and reduce the overall size and weight of the fuel cell.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
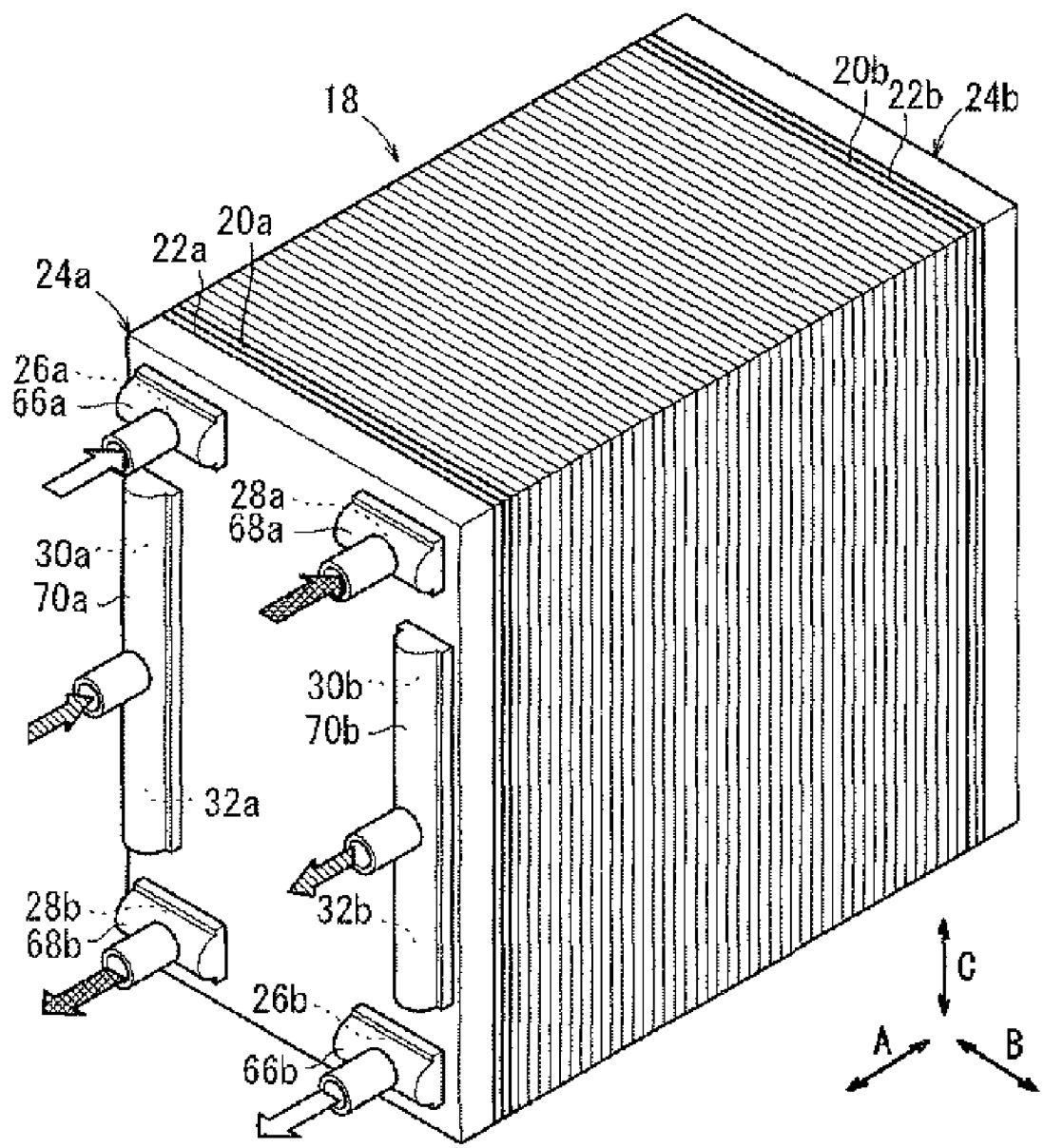
FIG. 1 is a perspective view schematically showing a fuel cell according to the first embodiment of the present invention.
Figure 2:
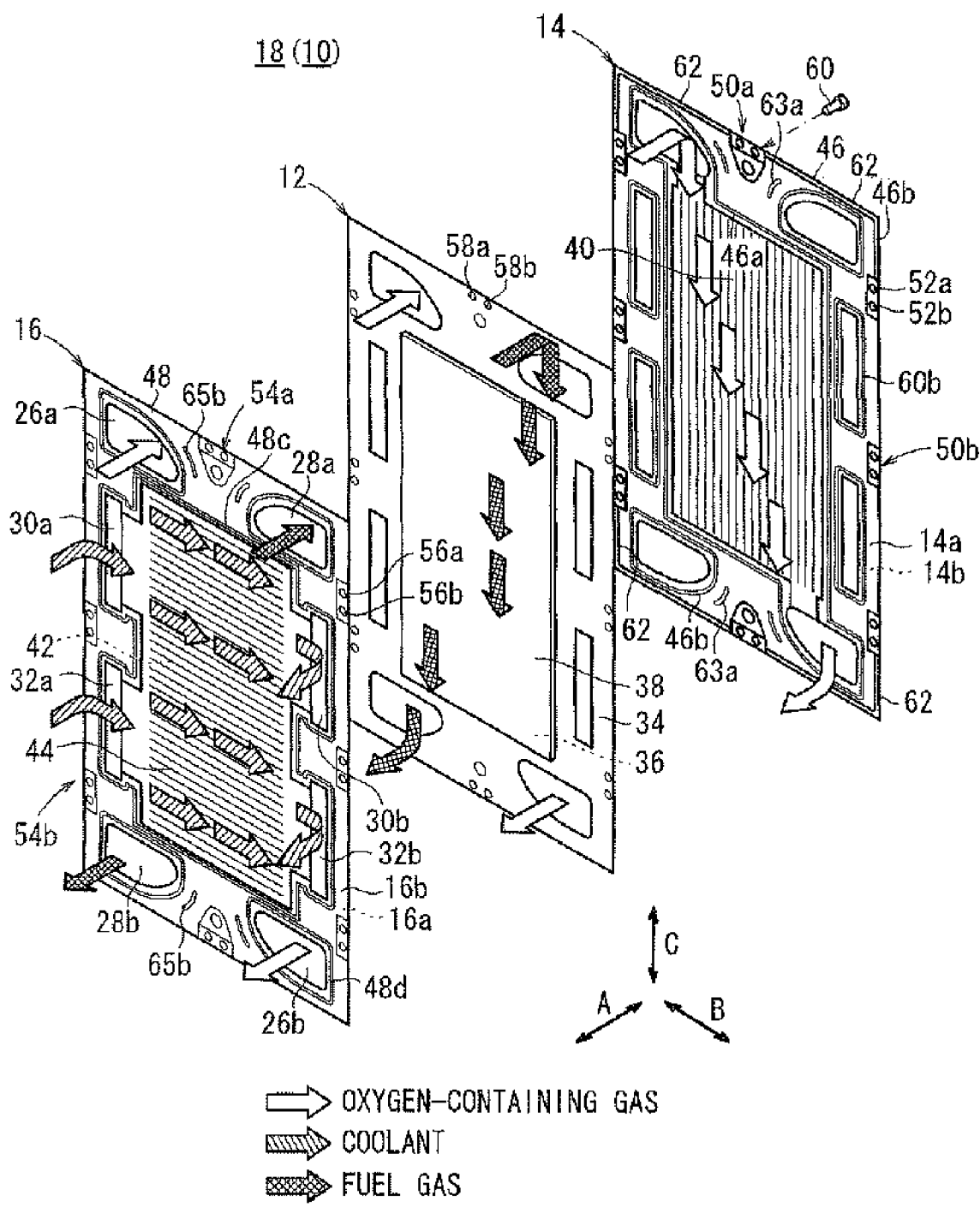
FIG. 2 is an exploded perspective view showing main components of the fuel cell.

FIG. 1 is a perspective view schematically showing a fuel cell 10 according to a first embodiment of the present invention. FIG. 2 is an exploded perspective view showing main components of the fuel cell 10.

The fuel cell 10 is formed by stacking a plurality of unit cells 18 in a direction indicated by an arrow A. Each of the unit cells 18 includes a membrane electrode assembly 12 and a first metal separator 14 and a second metal separator 16 sandwiching the membrane electrode assembly 12. For example, the first metal separator 14 and the second metal separator 16 are steel plates, stainless steel plates, aluminum plates, plated steel sheets, or metal plates having anti-corrosive surfaces by surface treatment.

As shown in FIG. 1, at opposite ends of the unit cells 18 in the stacking direction, terminal plates 20*a*, 20*b* are provided. Insulating plates 22*a*, 22*b* are provided outside the terminal plates 20*a*, 20*b*. Further, end plates 24*a*, 24*b* are provided outside the insulating plates 22*a*, 22*b*. For example, the fuel cell 10 is placed in a box shaped casing (not shown) including the end plates 24*a*, 24*b* each having a rectangular shape. Alternatively, the components of the fuel cell 10 are tightened together by a plurality of tie rods (not shown) extending in the direction indicated by the arrow A.

As shown in FIG. 2, each of the first metal separator 14 and the second metal separator 16 has an elongated shape having long sides extending in the direction of the gravity indicated by an arrow C and short sides extending in a horizontal direction indicated by an arrow B.

At an upper end of the unit cell 18 in the longitudinal direction, an oxygen-containing gas supply passage 26*a* for supplying an oxygen-containing gas, and a fuel gas supply passage 28*a* for supplying a fuel gas such as hydrogen-containing gas are provided. The oxygen-containing gas supply passage 26*a* and the fuel gas supply passage 28*a* extend through the unit cell 18 in the direction indicated by the arrow A.

At a lower end of the unit cell 18 in the longitudinal direction, a fuel gas discharge passage 28*b* for discharging the fuel gas and an oxygen-containing gas discharge passage 26*b* for discharging the oxygen-containing gas are provided. The fuel gas discharge passage 28*b* and the oxygen-containing gas discharge passage 26*b* extend through the unit cell 18 in the direction indicted by the arrow A. The openings of the oxygen-containing gas supply passage 26*a*, the fuel gas supply passage 28*a*, the oxygen-containing gas discharge passage 26*b*, and the fuel gas discharge passage 28*b* are curved at least at inner positions.

At one end of the unit cell 18 in the lateral direction indicated by the arrow B, one or more (two in the illustrated embodiment) coolant supply passages 30*a*, 32*a* are provided at upper and lower positions, and at the other end of the unit cell in the lateral direction, one or more (two in the illustrated embodiment) coolant discharge passages 30*b*, 32*b* are provided at upper and lower positions. The coolant supply passages 30*a*, 32*a* and the coolant discharge passages 30*b*, 32*b* extend through the unit cell 18 in the direction indicated by the arrow A.

The membrane electrode assembly 12 includes a cathode 36, an anode 38, and a solid polymer electrolyte membrane 34 interposed between the cathode 36 and the anode 38. The solid polymer electrolyte membrane 34 is formed by impregnating a thin membrane of perfluorosulfonic acid with water, for example.

Each of the cathode 36 and the anode 38 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 36 and the electrode catalyst layer of the anode 38 are fixed to both surfaces of the solid polymer electrolyte membrane 34, respectively.

The first metal separator 14 has an oxygen-containing gas flow field (reactant gas flow field) 40 on its surface 14*a* facing the membrane electrode assembly 12. The oxygen-containing gas flow field 40 is connected between the oxygen-containing gas supply passage 26*a* and the oxygen-containing gas discharge passage 26*b*.

The second metal separator 16 has a fuel gas flow field (reactant gas flow field) 42 on its surface 16*a* facing the membrane electrode assembly 12. The fuel gas flow field 42 is connected between the fuel gas supply passage 28*a* and the fuel gas discharge passage 28*b*. A coolant flow field 44 is formed between a surface 16*b* of the second metal separator 16 and a surface 14*b* of the first metal separator 14. The coolant flow field 44 is connected between the coolant supply passages 30*a*, 32*a* and the coolant discharge passages 30*b*, 32*b*.

A first seal member 46 is provided integrally with the surfaces 14*a*, 14*b* of the first metal separator 14, around the outer end of the first metal separator 14. A second seal member 48 is provided integrally with the surfaces 16*a*, 16*b* of the second metal separator 16, around the outer end of the second metal separator 16. Each of the first and second seal members 46, 48 is made of seal material, cushion material, or packing material such as an EPDM (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

Figure 3:
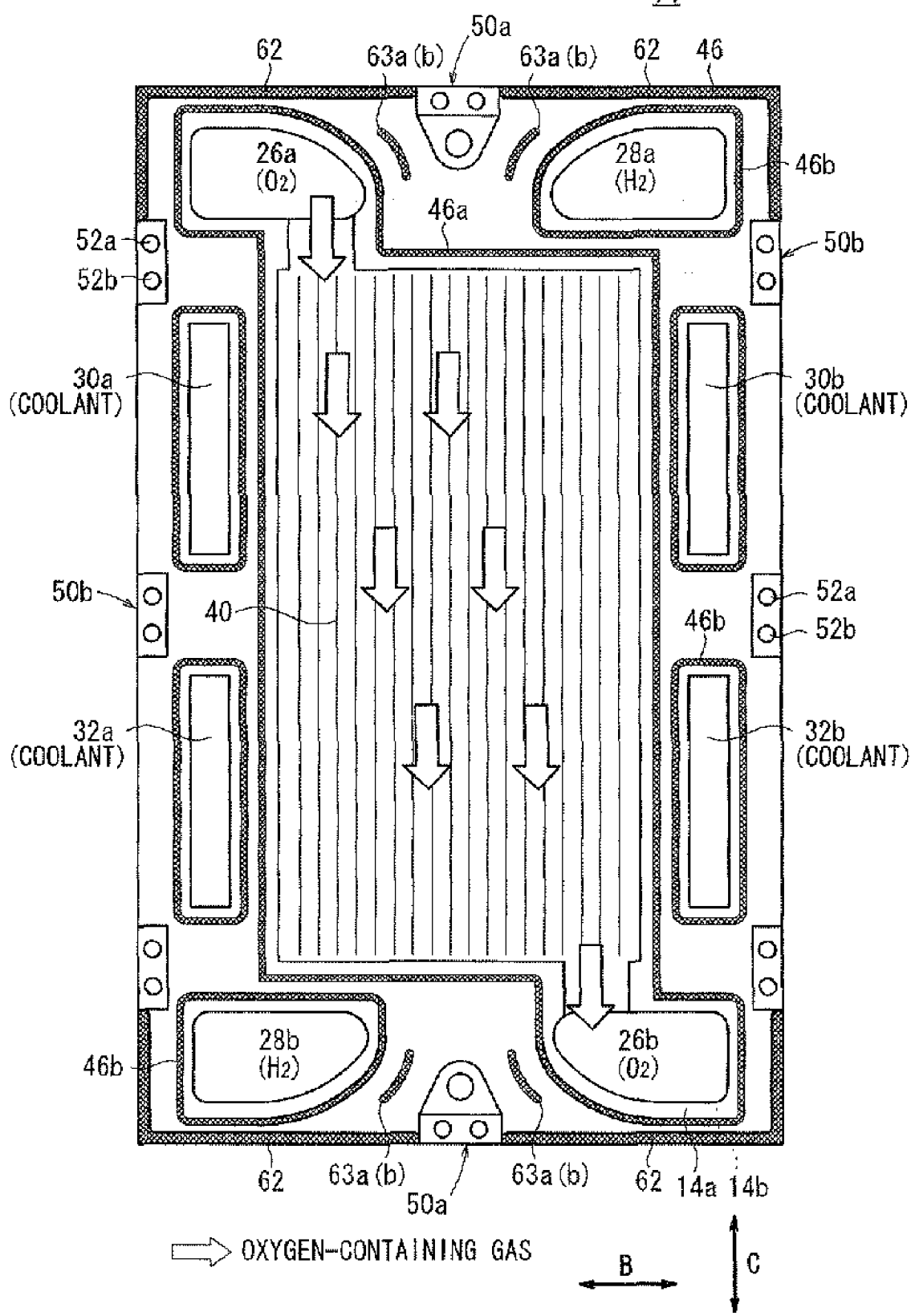
FIG. 3 is a front view showing a first metal separator of the fuel cell.

As shown in FIG. 3, the first seal member 46 includes a flow field seal (surrounding seal) 46*a* and ring-like seals (surrounding seals) 46*b* on the surface 14*a* of the first metal separator 14. The flow field seal 46*a* is formed around the oxygen-containing gas flow field 40, the oxygen-containing gas supply passage 26*a*, and the oxygen-containing gas discharge passage 26*b*. The ring-like seals 46*b* are formed around the fuel gas supply passage 28*a*, the fuel gas discharge passage 28*b*, the coolant supply passages 30*a*, 32*a*, and the coolant discharge passages 30*b*, 32*b*, respectively.

Figure 4:
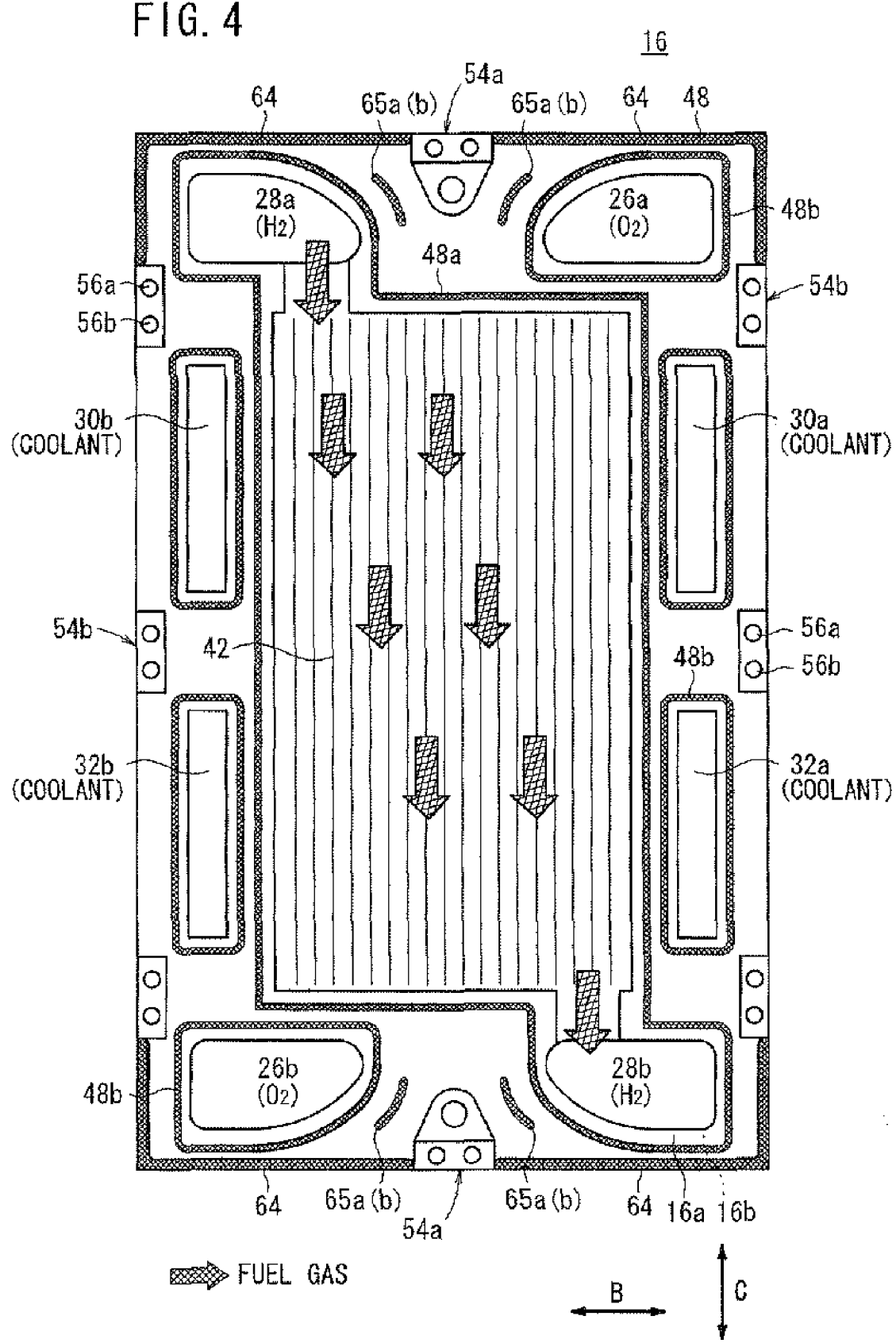
FIG. 4 is a front view showing a second metal separator of the fuel cell.

As shown in FIG. 4, the second seal member 48 includes a flow field seal (surrounding seal) 48*a* and ring-like seals (surrounding seals) 48*b* on the surface 16*a* of the second metal separator 16. The flow field seal 48*a* is formed around the fuel gas flow field 42, the fuel gas supply passage 28*a*, and the fuel gas discharge passage 28*b*. The ring-like seals 48*b* are formed around the oxygen-containing gas supply passage 26*a*, the oxygen-containing gas discharge passage 26*b*, the coolant supply passages 30*a*, 32*a*, and the coolant discharge passages 30*b*, 32*b*, respectively.

As shown in FIG. 2, the second seal member 48 includes a flow field seal (surrounding seal) 48*c* and ring-like seals (surrounding seals) 48*d* on the surface 16*b* of the second metal separator 16. The flow field seal 48*c* is formed around the coolant flow field 44, the coolant supply passages 30*a*, 32*a*, and the coolant discharge passages 30*b*, 32*b*. The ring-like seals 48*d* are formed around the oxygen-containing gas supply passage 26*a*, the oxygen-containing gas discharge passage 26*b*, the fuel gas supply passage 28*a*, and the fuel gas discharge passage 28*b*, respectively.

A plurality of resin load receivers 50*a*, 50*b* are formed integrally with the outer ends of the first metal separator 14, corresponding to cutout portions (not shown) of the metal plate of the first metal separator 14. The load receivers 50*a* are provided at both of upper and lower opposite edges of the first metal separator 14, and the load receivers 50*b* are provided at both of left and right edges of the first metal separator 14. Holes 52*a*, 52*b* are provided in parallel to each other in each of the load receivers 50*a*, 50*b*.

A plurality of resin load receivers 54*a*, 54*b* are formed integrally with the outer ends of the second metal separator 16, at positions overlapped with the load receivers 50*a*, 50*b* of the first meta separator 14 in the direction indicated by the arrow A. Holes 56a, 56b are formed in the load receivers 54a, 54b, and the holes 56a, 56b are connected to holes 52a, 52b of each of the load receivers 50a, 50b.

A hole 58a connected to the holes 52a, 56a and a hole 58b connected to the holes 52b, 56b are formed in the solid polymer electrolyte membrane 34. In each of the unit cells 18, a connection member such as an insulating resin clip 60 is inserted into the holes 52a, 58a, and 56a or the holes 52b, 58b, and 56b (see FIG. 2).

As shown in FIG. 3, corner reinforcement ribs 62 are provided on the surface 14a of the first metal separator 14, at corner portions which are narrow because the oxygen-containing gas supply passage 26a, the fuel gas supply passage 28a, the oxygen-containing gas discharge passage 26b, and the fuel gas discharge passage 28b are provided, i.e., at respective corners with small strength, between the load receivers 50a, 50b. The corner reinforcement ribs 62 are formed integrally with the first metal separator 14, using the same material as the first seal member 46. The corner reinforcement ribs 62 are wider than the flow field seal 46a formed around the oxygen-containing gas supply passage 26a.

The first seal member 46 includes auxiliary seals 63a provided between the load receivers 50a and each of the oxygen-containing gas supply passage 26a, the fuel gas supply passage 28a, the oxygen-containing gas discharge passage 26b, and the fuel gas discharge passage 28b. Preferably, the auxiliary seals 63a are provided in relatively wide areas. The oxygen-containing gas supply passage 26a, the fuel gas supply passage 28a, the oxygen-containing gas discharge passage 26b, and the fuel gas discharge passage 28b have openings curved in directions away from the load receiver 50a. The auxiliary seals 63a are provided at the positions between load receiver 50a and the curved portions of the openings.

The cross sectional shape of the auxiliary seal 63a is the same as those of the flow field seal 46a and the ring-like seal 46b, and the auxiliary seal 63a is provided independently (remotely) from the flow field seal 46a and the ring-like seal 46b. Auxiliary seals 63b are provided on the surface 14b, at the same positions as the positions of the auxiliary seals 63a.

As shown in FIG. 4, corner reinforcement ribs 64 are provided on the surface 16a of the second metal separator 16, at respective corners where the oxygen-containing gas supply passage 26a, the fuel gas supply passage 28a, the oxygen-containing gas discharge passage 26b, and the fuel gas discharge passage 28b are provided, between the load receivers 54a, 54b. The corner reinforcement ribs 64 are formed integrally with the second metal separator 16, using the same material as the second seal member 48. The corner reinforcement ribs 64 are wider than the ring-like seal 48b around the oxygen-containing gas supply passage 26a.

The second seal member 48 includes auxiliary seals 65a, provided between the load receivers 54a and each of the oxygen-containing gas supply passage 26a, the fuel gas supply passage 28a, the oxygen-containing gas discharge passage 26b, and the fuel gas discharge passage 28b. Preferably, the auxiliary seals 65a are provided in relatively wide areas.

The auxiliary seals 65a have the same structure as the auxiliary seals 63a. The cross sectional shape of the auxiliary seal 65a is the same as those of the flow field seal 48a and the ring-like seal 48b, and the auxiliary seals 65a are provided independently (remotely) from the flow field seal 48a and the ring-like seal 48b. Auxiliary seals 65b are provided on the surface 16b, at the same positions as the positions of the auxiliary seals 65a (see FIGS. 2 and 4).

As shown in FIG. 1, an oxygen-containing gas inlet manifold 66a, a fuel gas inlet manifold 68a, an oxygen-containing gas outlet manifold 66b, and a fuel gas outlet manifold 68b are provided at upper and lower opposite ends of the end plate 24a. The oxygen-containing gas inlet manifold 66a is connected to the oxygen-containing gas supply passage 26a, the fuel gas inlet manifold 68a is connected to the fuel gas supply passage 28a, the oxygen-containing gas outlet manifold 66b is connected to the oxygen-containing gas discharge passage 26b, and the fuel gas outlet manifold 68b is connected to the fuel gas discharge passage 28b.

A coolant Inlet manifold 70a and a coolant outlet manifold 70b are provided at left and right ends of the end plate 24a. The coolant inlet manifold 70a is connected to the coolant supply passages 30a, 32a, and the coolant outlet manifold 70b is connected to the coolant discharge passages 30b, 32b.

Operation of the fuel cell 10 will be described below.

Firstly, as shown in FIG. 1, in the fuel cell 10, an oxygen-containing gas is supplied to the oxygen-containing gas inlet manifold 66a, and a fuel gas such as a hydrogen-containing gas is supplied to the fuel gas inlet manifold 68a. Further, a coolant such as pure water or ethylene glycol is supplied to the coolant inlet manifold 70a.

As shown in FIGS. 2 and 3, the oxygen-containing gas flows from the oxygen-containing gas supply passage 26a of each unit cell 18 to the oxygen-containing gas flow field 40 of the first metal separator 14. The oxygen-containing gas flows along the cathode 36 of the membrane electrode assembly 12 downwardly for inducing an electrochemical reaction at the cathode 36.

As shown in FIG. 4, the fuel gas flows from the fuel gas supply passage 28a of each unit cell 18 to the fuel gas flow field 42 of the second metal separator 16. The fuel gas flows along the anode 38 of the membrane electrode assembly 12 downwardly for inducing an electrochemical reaction at the anode 38.

Thus, in each of the membrane electrode assemblies 12, the oxygen-containing gas supplied to the cathode 36, and the fuel gas supplied to the anode 38 are consumed in the electrochemical reactions at catalyst layers of the cathode 36 and the anode 38 for generating electricity.

The oxygen-containing gas consumed at the cathode 36 is discharged from the oxygen-containing gas discharge passage 26b to the oxygen-containing gas outlet manifold 66b (see FIG. 1). Likewise, the fuel gas consumed at the anode 38 is discharged from the fuel gas discharge passage 28b to the fuel gas outlet manifold 68b.

Further, after the coolant flows from the coolant inlet manifold 70a into the coolant supply passages 30a, 32a separately, as shown in FIG. 2, the coolant flows into the coolant flow field 44 between the first and second metal separators 14, 16. The coolant flows in the horizontal direction indicated by the arrow B. After the coolant cools the membrane electrode assembly 12, the coolant is discharged from the coolant supply passages 30b, 32b to the coolant outlet manifold 70b.

In the first embodiment, for example, as shown in FIG. 3, the auxiliary seals 63a are provided between the load receivers 50a and the oxygen-containing gas supply passage 26a, the fuel gas supply passage 28a, the oxygen-containing gas discharge passage 26b, and the fuel gas discharge passage 28b, respectively.

In the structure, even if seal displacement occurs between the first seal member 46 of the first metal separator 14 and the second seal member 48 of the second metal separator 16, it is possible to reliably prevent the first metal separator 14 and the second metal separator 16 from being bent by the moment of the seal line pressure.

Thus, with the simple structure, the desired sealing performance is maintained in the oxygen-containing gas supply passage 26a, the fuel gas supply passage 28a, the oxygen-containing gas discharge passage 26b, and the fuel gas discharge passage 28b, and reduction in the overall size and weight of the fuel cell 10 is achieved advantageously.

Further, the cross sectional shape of the auxiliary seal 63a is the same as those of the flow field seal 46a and the ring-like seal 46b. Thus, no excessive load is applied to the auxiliary seal 63a, and the desired sealing performance is maintained in the entire first seal member 46.

The auxiliary seals 63a, 63b are provided on both surfaces 14a, 14b of the first metal separator 14, at the same positions in the stacking direction. In the structure, it is possible to reliably hold the first metal separator 14 in opposition to the load in the stacking direction, and prevent deformation or the like in the first metal separator 14.

Also in the second metal separator 16, the same advantages as in the case of the first metal separator 14 are obtained.

Further, the load receivers 50a, 50b are provided in the outer end of the first metal separator 14, and the load receivers 54a, 54b are provided in the outer and of the second metal separator 16, at positions overlapped with the load receivers 50a, 50b of the first metal separator 14 in the stacking direction indicated by the arrow A. Thus, even if a load is applied externally to the fuel cell 10, the load can be received reliably by the resin load receivers 50a, 50b, 54a, and 54b.

Figure 5:
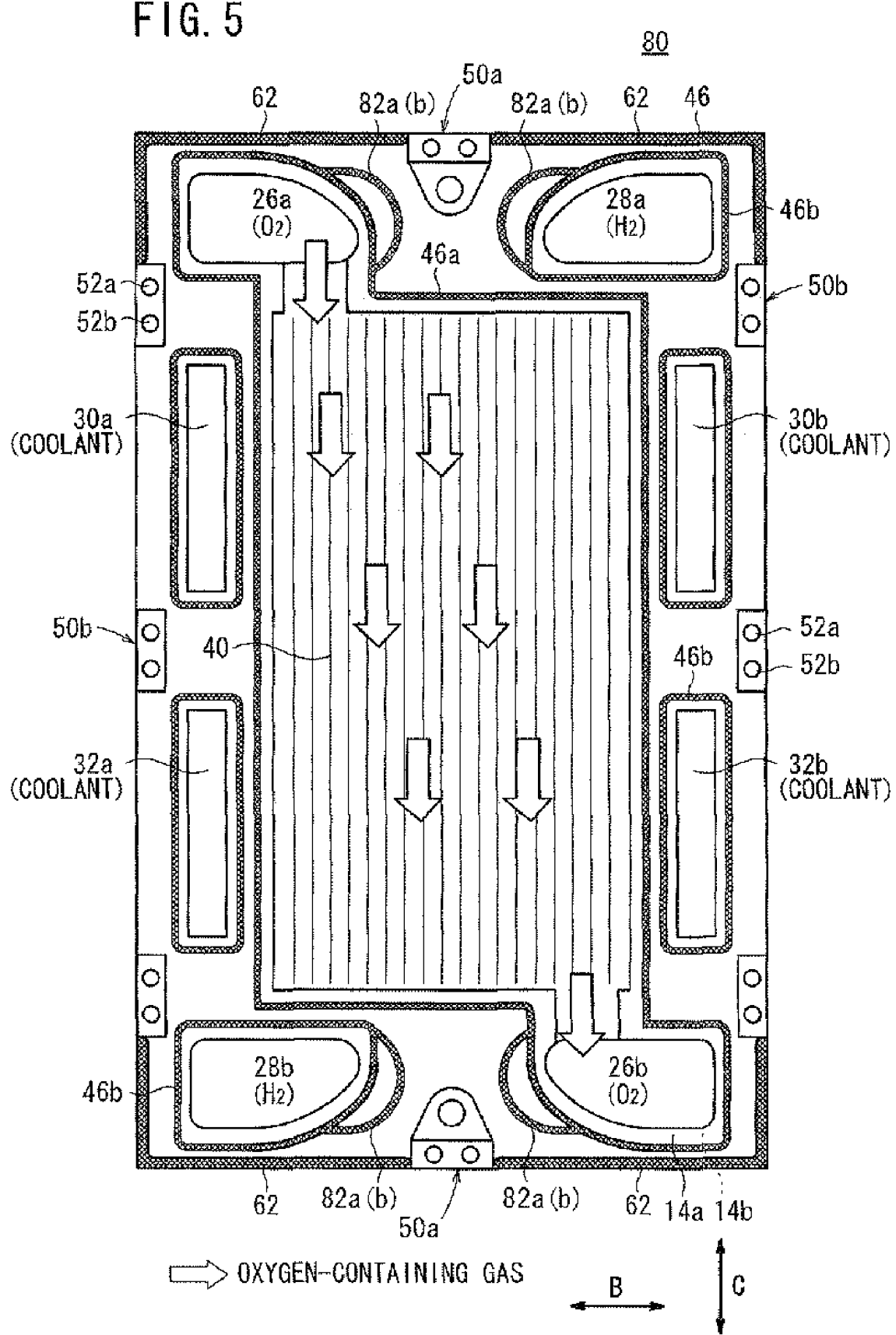
FIG. 5 is a front view showing a first metal separator of a fuel cell according to the second embodiment of the present invention.

FIG. 5 is a front view showing a first metal separator 80 of a fuel cell according to a second embodiment of the present invention. The constituent elements that are identical to those of the first metal separator 14 of the fuel cell 10 according to the first embodiment are labeled with the same reference numeral, and description thereof will be omitted. Further, the structure of the second metal separator is substantially the same as the structure of the first metal separator 80, and description thereof will be omitted.

Auxiliary seals 82a are provided on the surface 14a of the first metal separator 80, between the load receivers 50a and each of the oxygen-containing gas supply passage 26a, the fuel gas supply passage 28a, the oxygen-containing gas discharge passage 26b, and the fuel gas discharge passage 28b. Preferably, the auxiliary seals 82a are provided in relatively wide areas.

The cross sectional shape of the auxiliary seals 82a is the same as those of the flow field seal 46a and the ring-like seal 46b, and the auxiliary seals 82a are formed integrally with the flow field seal 46a and the ring-like seal 46b. Auxiliary seals 82b are provided on the surface 14b, at the same positions as the positions of the auxiliary seals 82a.

In the second embodiment, the auxiliary seals 82a are provided in the areas where the first metal separator 80 may bend easily. In the structure, the same advantages as in the case of the first embodiment are obtained. For example, the desired sealing performance is maintained in the oxygen-containing gas supply passage 26a, the fuel gas supply passage 28a, the oxygen-containing gas discharge passage 26b, and the fuel gas discharge passage 28b, and reduction in the overall size and weight of the fuel cell is achieved.

Figure 6:
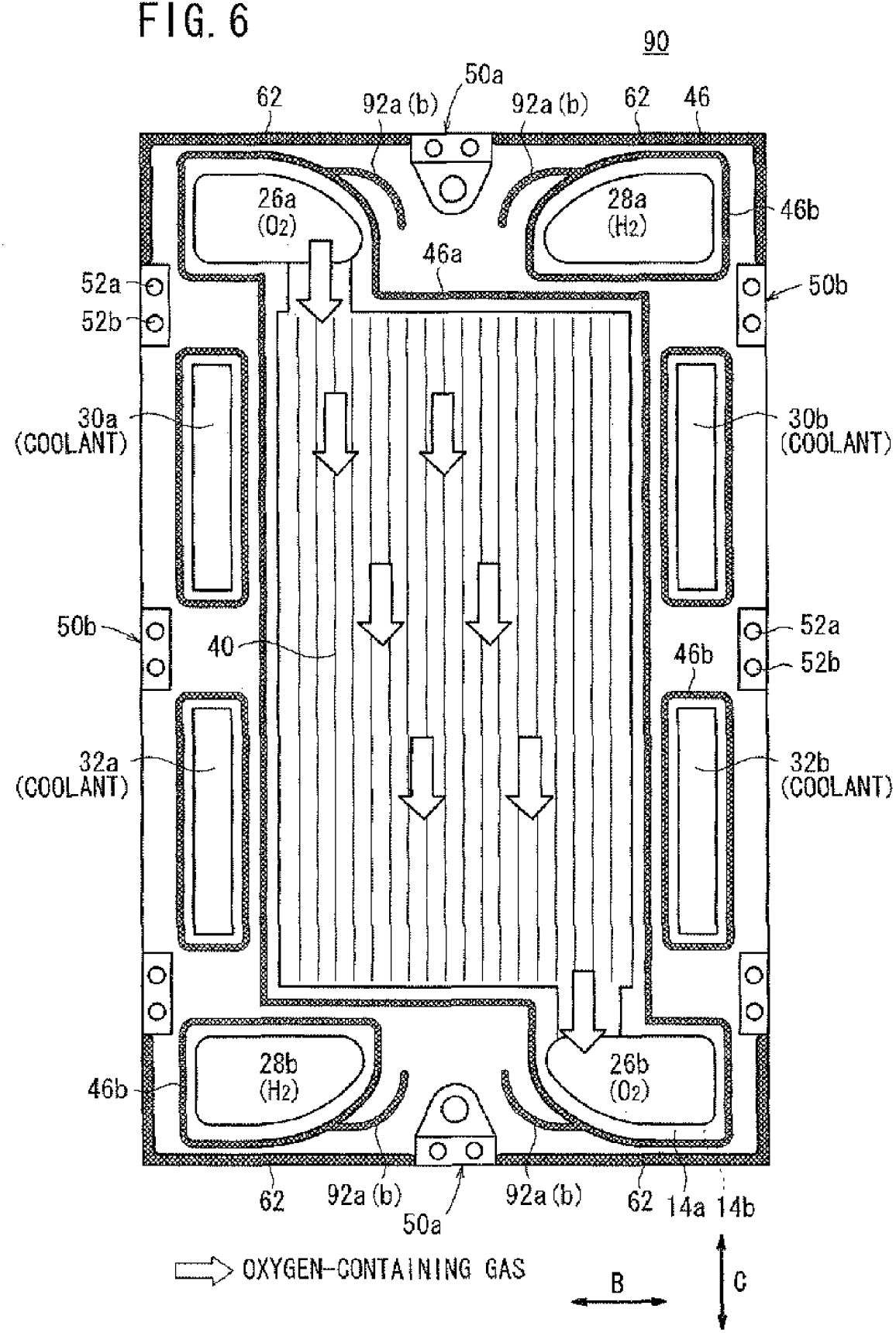
FIG. 6 is a front view showing a first metal separator of a fuel cell according to the third embodiment of the present invention.
Figure 7:
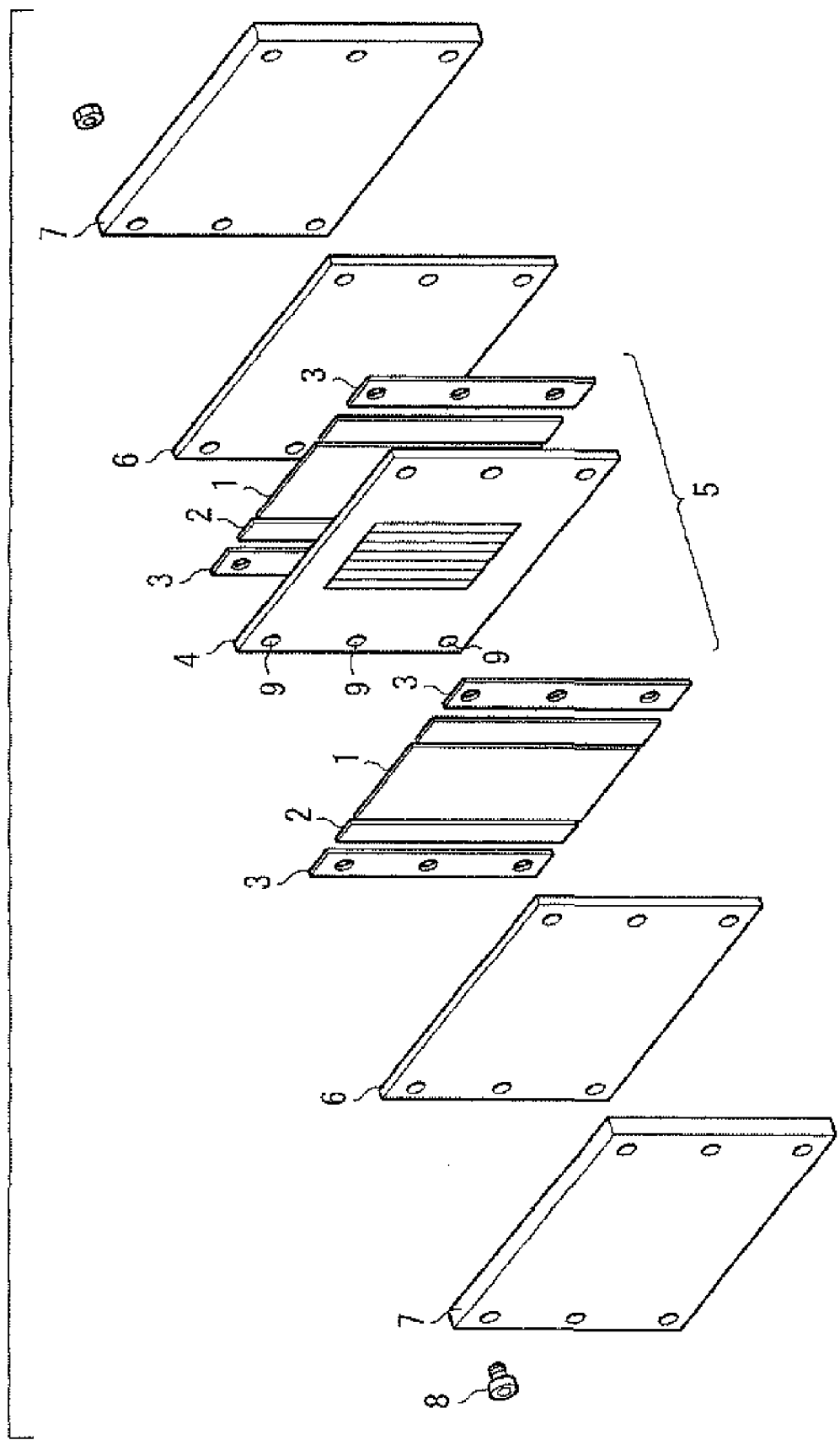
FIG. 7 is a view showing a conventional fuel cell.

FIG. 6 is a front view showing a first metal separator 90 of a fuel cell according to a third embodiment of the present invention. The constituent elements that are identical to those of the first metal separator 14 of the fuel cell 10 according to the first embodiment are labeled with the same reference numeral, and description thereof will be omitted. Further, the structure of the second metal separator is substantially the same as the structure of the first metal separator 90, and description thereof will be omitted.

Auxiliary seals 92a are provided on the surface 14a of the first metal separator 90, between the load receiver 50a and each of the oxygen-containing gas supply passage 26a, the fuel gas supply passage 28a, the oxygen-containing gas discharge passage 26b, and the fuel gas discharge passage 28b. Preferably, the auxiliary seals 92a are provided in relatively wide areas.

The cross sectional shape of the auxiliary seals 92a is the same as those of the flow field seal 46a and the ring-like seal 46b, and each of the auxiliary seals 92a has one end formed integrally with the flow field seal 46a or the ring-like seal 46b, and each of the auxiliary seals 92a has the other end provided remotely from the flow field seal 46a and the ring-like seal 46b. Auxiliary seals 92b are provided on the surface 14b, at the same positions as the positions of the auxiliary seals 92a.

In the third embodiment, the auxiliary seals 92a are provided in the areas where the first metal separator 90 may bend easily. Thus, the same advantages as in the cases of the first and second embodiments are obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking an electrolyte electrode assembly and a metal separator in a stacking direction, said electrolyte electrode assembly including a pair of electrodes, and an electrolyte interposed between said electrodes, said metal separator including a seal member, a passage for at least a reactant gas extending through a corner of said metal separator in the stacking direction,
  wherein resin load receivers are provided in an outer end of said metal separator, said corner being interposed between said resin load receivers; and
  said seal member includes a surrounding seal formed around the passage, and auxiliary seal having the same shape in cross section as said surrounding seal and positioned between one of the resin load receivers and the passage, the auxiliary seal being a reinforcing seal not surrounding a passage for a reactant gas or a passage for a cooling medium.

2. A fuel cell according to claim 1, wherein the passage has an opening curved in a direction away from said resin load receiver.

3. A fuel cell according to claim 1, wherein each of surfaces of said metal separator has said auxiliary seal at the same position in the stacking direction.

4. A fuel cell according to claim 1, wherein said auxiliary seal is formed independently from said surrounding seal.

5. A fuel cell according to claim 1, wherein each of said auxiliary seals has opposite ends formed integrally with said surrounding seal.

6. A fuel cell according to claim 1, wherein said auxiliary seal has an end formed integrally with said surrounding seal.

7. A fuel cell according to claim 1, wherein a corner enforcement rib is formed at said corner of said metal separator using the same material as said seal member.

* * * * *